(12) United States Patent
Holmes

(10) Patent No.: US 7,427,252 B2
(45) Date of Patent: Sep. 23, 2008

(54) ELECTRICALLY VARIABLE TRANSMISSION WITH INPUT SPLIT MODE AND COMPOUND SPLIT MODES

(75) Inventor: Alan G. Holmes, Clarkston, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 152 days.

(21) Appl. No.: 11/263,175

(22) Filed: Oct. 31, 2005

(65) Prior Publication Data
US 2007/0099738 A1 May 3, 2007

(51) Int. Cl.
F16H 3/72 (2006.01)

(52) U.S. Cl. .............................. 475/5; 475/10; 475/207

(58) Field of Classification Search ..................... 475/5, 475/10, 207, 198, 201, 218
See application file for complete search history.

(56) References Cited

U.S. PATENT DOCUMENTS

| | | | |
|---|---|---|---|
| 5,558,595 A | 9/1996 | Schmidt et al. | 477/3 |
| 5,931,757 A | 8/1999 | Schmidt | 475/2 |
| 6,478,705 B1 | 11/2002 | Holmes et al. | 475/5 |
| 6,527,658 B2 | 3/2003 | Holmes et al. | 475/5 |
| 6,558,283 B1 * | 5/2003 | Schnelle | 475/5 |
| 7,101,298 B2 * | 9/2006 | Sowul et al. | 475/5 |
| 7,264,071 B2 * | 9/2007 | Schmidt et al. | 180/65.6 |

* cited by examiner

*Primary Examiner*—Charles A. Marmor
*Assistant Examiner*—Derek D Knight

(57) ABSTRACT

A vehicle transmission includes a differential gear set having five coaxial gear elements and an output member. Two of the gear elements are controllable via torque transmitting mechanisms such as electric motors to establish a plurality of speed ratios between the input shaft and the output shaft. Two of the other gear elements are selectively operatively connectable to an output shaft via a gear arrangement that allows for a plurality of speed ratios between the gear elements and the output shaft. Additional torque transmitting mechanisms such as clutches are selectively engageable to provide continuously variable speed ranges between the input shaft and the output shaft, fixed gear ratios and an electric drive mode. The various speed ratios enable a plurality of compound split operating modes as well as an input split mode.

16 Claims, 1 Drawing Sheet

ELECTRICALLY VARIABLE TRANSMISSION WITH INPUT SPLIT MODE AND COMPOUND SPLIT MODES

TECHNICAL FIELD

The present invention relates to vehicle transmissions having a differential gear set and selectively engageable torque transmitting mechanisms including two electric motor-generators to provide continuously variable speed ranges, fixed gear ratios and an electric drive mode.

BACKGROUND OF THE INVENTION

A vehicle transmission can deliver mechanical power from an engine to the remainder of a drive system, typically fixed gearing, axles, and wheels. A transmission allows some freedom in engine operation, usually through alternate selection of five or six different drive ratios, a neutral selection that allows the engine to operate accessories with the vehicle stationary and reverse. Transmission gear selection typically allows power from the engine to be delivered to the rest of the drive system with a ratio of torque multiplication and speed reduction and with a ratio of torque reduction and speed multiplication known as overdrive.

An electric generator can transform mechanical power from the engine into electrical power, and an electric motor can transform that electric power back into mechanical power at different torques and speeds for the remainder of the vehicle drive system. This arrangement allows a continuous variation in the ratio of torque and speed between the engine and the remainder of the drive system, within the limits of the electric machinery. An electric storage battery used as a source of power for propulsion may be added to this arrangement, forming a series hybrid electric drive system.

The series hybrid system allows the engine to operate relatively independently of the torque, speed, and power to propel a vehicle, so as to be controlled for improved emissions and efficiency. This system also allows the electric machine attached to the engine to function as a motor to start the engine and allows the electric machine attached to the remainder of the drive train to act as a generator, recovering energy into the battery by regenerative braking. However, a series electric drive requires that the electrical machinery be sufficiently sized to transform all engine power from mechanical to electrical form and from electrical to mechanical form, and useful power is lost in this double conversion.

A power split transmission can use what is commonly understood to be "differential gearing" to achieve a continuously variable torque and speed ratio between input and output without sending all power through the variable elements. One form of differential gearing may constitute a planetary gear set. In fact, planetary gearing is usually the preferred embodiment employed in differentially geared inventions, with the advantage of compactness and different torque and speed ratios among all members of the planetary gear set. However, it is possible to construct this invention without planetary gears, as by using bevel differential gears or other differential gears.

A simple electrically variable transmission can use differential gearing to split power from the engine into two power paths to the wheels of the vehicle; an electro-mechanical path through a pair of electric machines or motor-generators and an all-mechanical parallel path that is fixed ratio or alternatively selectable. Electrically variable transmissions may form input-power-split, compound-power-split, or output-power-split configurations.

An electrically variable transmission in a vehicle can simply transmit mechanical power. To do so, the electric power produced by one motor-generator balances the electrical losses and the electric power consumed by the other motor-generator. A hybrid electrically variable transmission system in a vehicle includes an electrical storage battery, so the electric power generated by one motor-generator can be greater than or less than the electric power consumed by the other. Electric power from the battery can sometimes allow both motor-generators to act as motors, especially to assist the engine with vehicle acceleration. Both motors can sometimes act as generators to recharge the battery, especially in regenerative vehicle braking. Electric power from the battery also allows engine starting with the transmission system.

One of the most successful substitutes for the series hybrid transmission is the variable, two-mode, input-split, parallel-hybrid electric transmission. Such a transmission utilizes an input means to receive power from the vehicle engine and a power output member to deliver power to drive the vehicle. First and second motor-generators are connected to an energy storage device, such as a battery, so that the energy storage device can accept power from and supply power to the first and second motor-generators. A control means regulates power flow among the energy storage devices and the motor-generators as well as between the first and second motor-generators.

Operation in a first or second mode may be selectively achieved by using clutches. In one mode, the output speed of the transmission is directly proportional to the speed of one motor-generator, and in the second mode the output speed of the transmission increases along with the speed of the other motor-generator.

In some embodiments of the variable, two-mode, input-split, parallel-hybrid electric transmission a planetary gear set is selectively employed for torque multiplication. In addition, some embodiments may utilize three torque transmitting mechanisms—two to select the operational mode desired of the transmission and the third selectively to disconnect the transmission from the engine.

As those skilled in the art will appreciate, a transmission system using a power split arrangement may receive power from two sources. However, the prior art does not include any practical gear schemes with an input-split operating mode and more than two compound split operating modes.

SUMMARY OF THE INVENTION

The present invention combines the use of an input-split mode with any number of compound-split modes as provided by the transmission gearing. It also provides for operation in fixed gear ratios, to allow the transmission to function without using the electric motor-generators to carry power from input to output. This fixed gear operation allows the transmission to operate even if one or both of the motor-generators are disabled; it allows the transmission to be designed to carry more power without enlarging the capacity of the motor-generators; it allows the motor-generators to be used solely to convert battery power to output power or to convert power from the output into battery power at their full, combined capacity.

The mechanism consists of a compound planetary gear set attached to: the input, two electric motor-generators, and two selectable mechanical power paths to the output. The compound planetary gear set is interconnected to provide two independent speed variables, such as the input speed and a speed ratio through the gear set. The input, motor-generators, and output elements are attached to the compound planetary gear set such that their speeds may all be different from one another. Overall the speed of any element may be defined by a linear algebraic combination of the speeds of any two other elements.

Thus, the operation of a single mechanical power path from the compound planetary gear set to the output results in a continuously-variable speed ratio range for the transmission, which may be controlled by the action of the motor-generators.

The simultaneous operation of two mechanical power paths from the compound planetary gear set to the output results in a mechanical speed ratio. There is, further, at least one selectable connection between at least one of the electric motor-generators and the output. These selectable connections may be used to provide a low, launch range and a reverse launch range using an input power split. A lockup clutch may be provided to selectively operate the compound planetary gear set in direct drive, so that additional fixed gear ratios may be selected.

A vehicle transmission is provided. The transmission includes a differential gear set having first, second, third, fourth, and fifth gear elements operatively interconnected with one another. An input shaft is operatively connected to the first gear element. A first selectively engageable torque transmitting mechanism is mounted to a stationary member and is operatively connected to the second gear element. A second selectively engageable torque transmitting mechanism is mounted to the stationary member and is operatively connected to the third gear element. A first output means is operatively connected to the fourth gear element, and a second output means is operatively connected to the fifth gear element. Furthermore, at least one of the second or third gear elements may be operatively connected to an output member, and at least one of said fourth or fifth gear element may be operatively connected to the output by more than one selectively engageable torque transmitting mechanism.

The transmission of the invention may operate with fixed ratios, or may be employed with motor-generators as the first and second torque transmitting mechanisms to provide a large number of ratio ranges as a continuously variable transmission. Other torque transmitting mechanisms or clutches are selectively engageable to operatively connect various components of the transmission to provide continuously variable speed ranges, fixed gear ratios and electric drive. The gear set is configured such that the rotational speeds of two of the gear elements may be independently established and determine the rotational speeds of the other three gear elements.

The power required from the motor-generators in continuously variable operation is kept to a small fraction of power through the transmission while the ratio spread can be wide. The overall capacity or "corner power" of the motor-generators can also be kept as low as practical differential gearing will allow. Since electric motors are relatively expensive and inefficient as compared with gearing, limiting their size will help make the transmission relatively inexpensive and efficient. The input-split mode of operation prevents the counter flow of power or power loop that would be formed at launch with a compound-power-split operating range, easing the requirements for the electric motors.

The above features and other features and advantages of the present invention are readily apparent from the following detailed description of the best modes for carrying out the invention when taken in connection with the accompanying drawings.

DESCRIPTION OF THE PREFERRED EMBODIMENTS

Figures 1, 2:
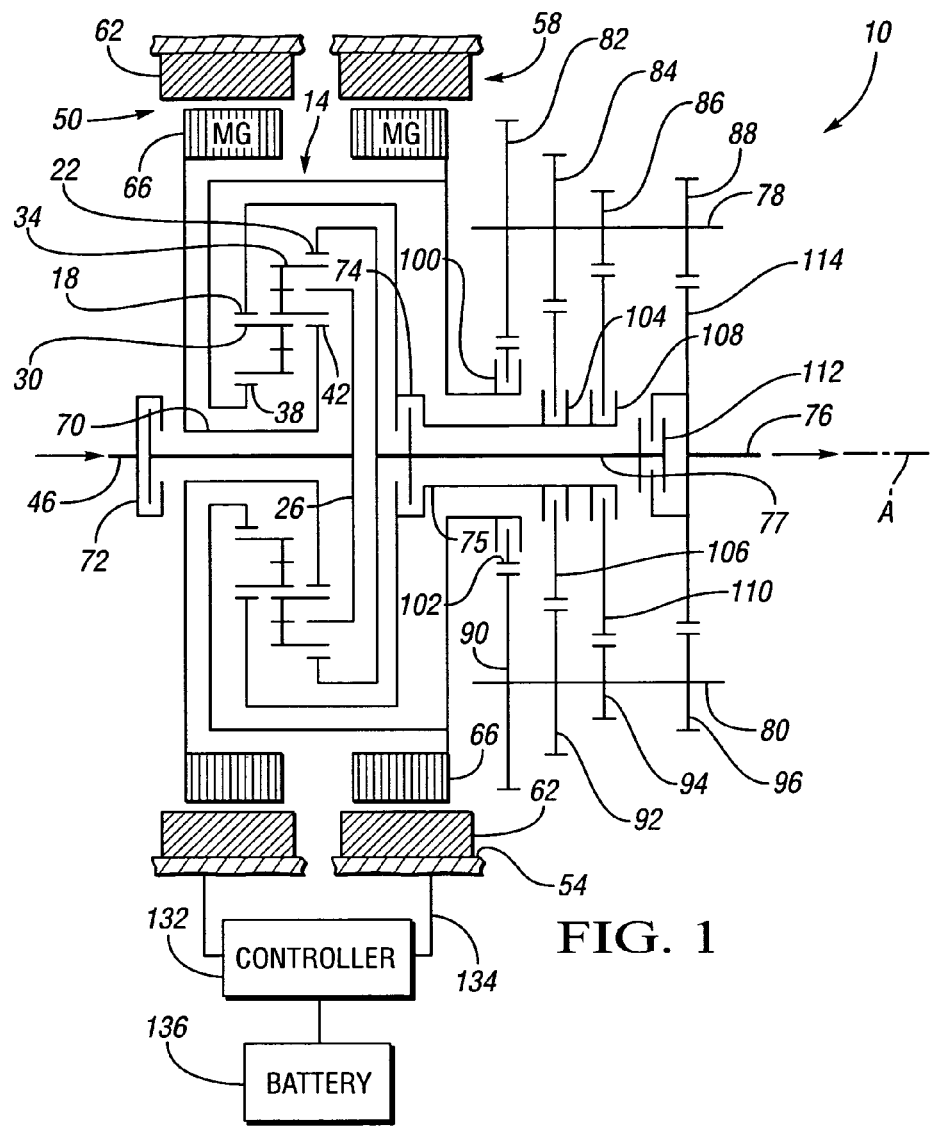
FIG. 1 is a schematic illustration of a vehicle transmission including a differential gear set according to the invention.
FIG. 2 is a chart depicting some of the operating characteristics of the vehicle transmission shown in FIG. 1.

The invention described herein is related to U.S. application Ser. No. 10/819,399 filed Apr. 7, 2004, entitled "Compound Differential Dual Power Path Transmission" which is commonly assigned with this application to General Motors, and which is hereby incorporated by reference in its entirety.

Referring to FIG. 1, a vehicular transmission 10 is schematically depicted. The transmission 10 includes a compound differential, Ravineaux gear set 14. The gear set 14 includes a first ring gear member 18, a second ring gear member 22, a planet carrier assembly member 26 including a first set of pinion gears 30 and a second set of pinion gears 34 rotatably mounted thereto, a first sun gear member 38, and a second sun gear member 42. The first sun gear member 38 is meshingly engaged with the first set of pinion gears 30. The second sun gear member 42 is meshingly engaged with the second set of pinion gears 34. The first ring gear member 18 is meshingly engaged with the first set of pinion gears 30, and the second ring gear member 22 is meshingly engaged with the second set of pinion gears 34. The first set of pinion gears 30 is meshingly engaged with the second set of pinion gears 34.

The differential gear set 14 has five members 18, 22, 26, 38, 42 on a common axis A, and is configured so that the speeds of any two of the gear members are capable of being established independently of one another, and the speeds of the other three gear members are dependent on the speeds established for the two gear members. Thus, for example, the rotational speeds of the planetary carrier 26 and the first sun gear 38 may be established independently, and the rotational speeds of the second sun gear 42, the first ring gear 18, and the second ring gear 22 are determined by the speeds of the planetary carrier 26 and the first sun gear 38. Similarly, the rotational speeds of the planetary carrier 26 and the second sun gear 42 may be established independently, and the rotational speeds of the first sun gear 38, the first ring gear 18, and the second ring gear 22 are determined by the speeds of the planetary carrier 26 and the second sun gear 42. The transmission 10 further comprises an input shaft 46.

A first torque transmitting mechanism 50 operatively interconnects the second sun gear member 42 and a stationary member such as the transmission housing 54. A second torque transmitting mechanism 58 operatively interconnects the first sun gear member 38 and the transmission housing 54. The first and second torque transmitting mechanisms 50, 58 may be electric motor-generators, or combinations of electric motor-generators with friction brakes within the scope of the claimed invention. In a preferred embodiment, the torque transmitting mechanisms 50, 58 are electric motors each having a stator 62 rigidly mounted to the housing 54 and a rotor 66 rigidly affixed to one of the sun gears 38, 42 for rotation therewith. The rotor 66 of the first torque transmitting mechanism 50 is affixed to sun gear 42 via a sleeve 70 around the input shaft 46.

Output Members

The transmission 10 includes two output members, namely, a first countershaft 78 and a second countershaft 80, that are operatively connected to the gear set 14 and that together provide three selectable power paths by which power may flow to an output shaft 76. Four gear members 82, 84, 86 and 88 are connected to the first countershaft 78 for rotation therewith. Four gear members 90, 92, 94 and 96 are connected to the second countershaft 80 for rotation therewith. Gear members 102, 106 and 110 are rotatably supported by a central shaft 77. Gear member 114 is rotatably supported by the output shaft 76. The gear members 102, 106, 110 and 114 are meshingly engaged with gear members 82, 84, 86 and 88, respectively. The gear members 102, 106, 110 and 114 are meshingly engaged with gear members 90, 92, 94 and 96, respectively.

Clutches

As illustrated in the embodiment shown in FIG. 1, multiple torque transmitting mechanisms, such as clutches, are configured to selectively establish a drive connection between various components of the transmission 10. A first clutch 72 is selectively engageable to operatively connect an input shaft 46 to the planet carrier assembly member 26.

A second clutch 74 is selectively engageable to operatively connect the first ring gear member 18 to the second ring gear 22, through a central shaft 77. A sleeve 75 surrounds the central shaft 77.

A third clutch 100 is selectively engageable to operatively connect the first sun gear member 38 (and rotor 66 of the second torque transmitting mechanism 58) to a gear member 102. Gear member 102 is rotatably supported by the central shaft 77. Gear member 102 is connected to countershafts 78 and 80 through meshing engagements with gear members 82 and 90, respectively.

A fourth clutch 104 is selectively engageable to operatively connect the first ring gear member 18 to a gear member 106. Gear member 106 is rotatably supported by the central shaft 77. Gear member 106 is connected to countershafts 78 and 80 through meshing engagements with gear members 84 and 92, respectively.

A sixth clutch 108 is selectively engageable to operatively connect the first ring gear member 18 to a gear member 110. Gear member 110 is rotatably supported by the central shaft 77. Gear member 110 is connected to countershafts 78 and 80 through meshing engagements with gear members 86 and 94, respectively.

A fifth clutch 112 is selectively engageable to operatively connect the second ring gear 22, through the central shaft 77, to a gear member 114 which is connected to the output shaft 76.

Modes of Operation

As shown in FIG. 2 and described below, the torque-transmitting mechanisms and clutches shown in FIG. 1 are selectively engageable to provide multiple continuously variable speed ranges (V1-V4), fixed gear ratios (F1-F7) and an electric drive mode (E1).

Fixed Speed Ratios

A first forward speed ratio F1 is established with the engagement of first clutch 72, second clutch 74 and third clutch 100. The first clutch 72 operatively connects the input shaft 46 to the planet carrier assembly member 26. The second clutch 74 operatively connects the first ring gear member 18 to the second ring gear member 22. The third clutch 100 operatively connects the first sun gear member 38 to two output members, the first countershaft 78 and the second countershaft 80.

A second forward speed ratio F2 is established with the engagement of first clutch 72, third clutch 100 and fourth clutch 104. The first clutch 72 operatively connects the input shaft 46 to the planet carrier assembly member 26. The third clutch 100 operatively connects the first sun gear member 38 to two output members, the first countershaft 78 and the second countershaft 80. The fourth clutch 104 operatively connects the first ring gear member 18 to one of the two output members, the first countershaft 78 and the second countershaft 80.

A third forward speed ratio F3 is established with the engagement of first clutch 72, second clutch 74 and fourth clutch 104. The first clutch 72 operatively connects the input shaft 46 to the planet carrier assembly member 26. The second clutch 74 operatively connects the first ring gear member 18 to the second ring gear member 22. The fourth clutch 104 operatively connects the first ring gear member 18 to two output members, the first countershaft 78 and the second countershaft 80.

A fourth forward speed ratio F4 is established with the engagement of first clutch 72, fourth clutch 104 and fifth clutch 112. The first clutch 72 operatively connects the input shaft 46 to the planet carrier assembly member 26. The fourth clutch 104 operatively connects the first ring gear member 18 to two output members, the first countershaft 78 and the second countershaft 80. The fifth clutch 112 operatively connects the second ring gear 22 to the output shaft 76.

A fifth forward speed ratio F5 is established with the engagement of first clutch 72, second clutch 74 and fifth clutch 112. The first clutch 72 operatively connects the input shaft 46 to the planet carrier assembly member 26. The second clutch 74 operatively connects the first ring gear member 18 to the second ring gear member 22. The fifth clutch 112 operatively connects the second ring gear 22 to the output shaft 76.

A sixth forward speed ratio F6 is established with the engagement of first clutch 72, sixth clutch 108 and fifth clutch 112. The first clutch 72 operatively connects the input shaft 46 to the planet carrier assembly member 26. The sixth clutch 108 operatively connects the first ring gear member 18 to two output members, the first countershaft 78 and the second countershaft 80. The fifth clutch 112 operatively connects the second ring gear 22 to the output shaft 76.

A seventh forward speed ratio F7 is established with the engagement of first clutch 72, second clutch 74 and sixth clutch 108. The first clutch 72 operatively connects the input shaft 46 to the planet carrier assembly member 26. The second clutch 74 operatively connects the first ring gear member 18 to the second ring gear member 22. The sixth clutch 108 operatively connects the first ring gear member 18 to two output members, the first countershaft 78 and the second countershaft 80.

Electric Drive Mode

An electric drive mode E1 is established with the engagement of the third clutch 100. The third clutch 100 operatively connects the first sun gear member 38 to two output members, the first countershaft 78 and the second countershaft 80. The input shaft 46 is not connected to the rest of the transmission 10 i.e. the engine is disconnected from the transmission 10. Power is provided by the torque transmitting mechanisms 50, 58 functioning as electric motors.

Continuously Variable Range Modes

When the torque transmitting mechanisms 50, 58 are motors or include motors, the transmission 10 can be operated as a CVT, by absorbing power with one motor and using it in the other motor. The transmission 10 of FIG. 1 is capable of multiple continuously variable ranges or modes.

A first variable speed range V1 is established with the engagement of first clutch 72 and third clutch 100. The first clutch 72 operatively connects the input shaft 46 to the planet carrier assembly member 26. The third clutch 100 operatively connects the first sun gear member 38 to two output members, the first countershaft 78 and the second countershaft 80.

A second variable speed range V2 is established with the engagement of first clutch 72 and fourth clutch 104. The first clutch 72 operatively connects the input shaft 46 to the planet carrier assembly member 26. The fourth clutch 104 operatively connects the first ring gear member 18 to two output members, the first countershaft 78 and the second countershaft 80.

A third variable speed range V3 is established with the engagement of first clutch 72 and fifth clutch 112. The first clutch 72 operatively connects the input shaft 46 to the planet carrier assembly member 26. The fifth clutch 112 operatively connects the second ring gear 22 to the output shaft 76.

A fourth variable speed range V4 is established with the engagement of first clutch 72 and sixth clutch 108. The first clutch 72 operatively connects the input shaft 46 to the planet carrier assembly member 26. The sixth clutch 108 operatively connects the first ring gear member 18 to two output members, the first countershaft 78 and the second countershaft 80.

The continuously variable ranges are input power split when third clutch 100 is engaged i.e. variable range V1 is input split. Modes V2, V3 and V4 are compound split. The input-power-split configuration has special advantage for vehicle launching, because one of the electric motor-generators is at zero speed with the output at zero speed; no power loop is present during launch. A compound power split configuration has special advantage for operation with finite speed ratios because they have a definite and relatively broad range where transmission power is fed forward and no power loop is present in this range.

Each CVT range or mode is covered as the speed of one torque transmitting mechanism is decreasing and the speed of the other is increasing. Thus, each CVT mode corresponds to a shift between the fixed speed ratios of the transmission as described above. Transitions between successive modes or ranges occur as the countershaft gearing is selectively engaged and disengaged, and correspond to fixed speed ratios of the transmission described above.

Thus, the same transmission gearing, compound planetary gearing, and dual countershaft gearing can be useful in both stepped ratio and continuously variable transmissions, and, in fact, a transmission can be constructed to operate effectively in both ways. The transmission 10 can be operated practically as a stepped ratio transmission, CVT, or combination of the two.

It should be noted that the first countershaft 78 and the second countershaft 80 may be operatively connected to the output shaft 76 simultaneously so that both countershafts transmit power to the output shaft.

The torque transmitting mechanisms 50, 58 selectively control the rotational speed of the sun gears 42, 38. As described above, different speed ratios between the input shaft 46 and the two countershafts 78 and 80 are established through selective engagement of the torque transmitting mechanisms 50, 58 and clutches 72, 74, 100, 104, 112, 108 and corresponding control of sun gear speed.

While countershafts 78, 80 are employed together as a single operative output means and the output shaft is employed directly as another output means in a preferred embodiment, those skilled in the art will recognize a variety of different output member configurations that may be employed within the scope of the invention to form dual power paths from the gear set 14 to an output shaft 76. For example, members of a second planetary gear set may be operatively connected to the first and second ring gears 18 and 22 and selectively engageable via clutches to an output shaft. Moreover, those skilled in the art will recognize that it may be desirable to add additional gears to the countershafts and the output shaft to increase the number of speed ratios available between the countershafts and the output shaft.

In a preferred embodiment, the transmission 10 also includes an energy storage device such as a battery 136 operatively connected via conductive wires 134 to the motors of torque transmitting mechanisms 50, 58 to receive power from them and to supply power to them. A controller 132 is operatively connected to the battery and the motors to regulate the flow of power among them. Thus, a hybrid transmission is formed. If torque transmitting mechanisms 50, 58 are electric generators, they can apply torque indefinitely even if their shafts are rotating. Thus, the shifts described above can be transformed into compound power split operating ranges. That is, the braking torque and speed applied by one of the torque transmitting mechanisms to spin the gear set element corresponding to one of the countershafts slower than the input can be transformed into power used by the other torque transmitting mechanism to spin the element corresponding to the other countershaft faster than the input.

While the best modes for carrying out the invention have been described in detail, those familiar with the art to which this invention relates will recognize various alternative designs and embodiments for practicing the invention within the scope of the appended claims.

The invention claimed is:

1. A vehicle transmission comprising:
a stationary member;
a differential gear set having first, second, third, fourth, and fifth coaxial gear elements operatively interconnected with one another;
an input shaft;
an output shaft;
first, second, third, fourth, fifth and sixth torque-transmitting mechanisms selectively engageable to operatively connect one of said gear elements with said stationary member or with said output shaft;
wherein the first and second of said torque-transmitting mechanisms are capable of operatively exchanging power with one another;
wherein said torque-transmitting mechanisms are configured to produce an input-split operating mode, a first compound-split operating mode, a second compound-split operating mode and a third compound-split operating mode of the transmission;
wherein said third torque transmitting mechanism is selectively engageable to operatively connect one of said gear elements to the output shaft to form an input-split operating mode, wherein said one of said gear elements is continuously connected to said first or second torque transmitting mechanism such that the rotational speed of said one of said gear elements is proportional to the rotational speed of said first or second torque transmitting mechanism;
wherein the differential gear set is configured such that the rotational speeds of two of the gear elements may be independently established and determine the rotational speeds of the other three gear elements;
the fourth torque transmitting mechanism is selectively engageable to operatively connect the fourth gear element to the output shaft to form the first compound-split operating mode;
the fifth torque transmitting mechanism is selectively engageable to operatively connect the fifth gear elements to said output shaft to form the second compound-split operating mode; and the sixth torque transmitting mechanism is selectively engageable to operatively connect said fourth gear element to the output shaft to form the third compound-split operating mode.

2. A vehicle transmission comprising:
a stationary member;
a differential gear set having first, second, third, fourth, and fifth coaxial gear elements operatively interconnected with one another;
an input shaft;
an output shaft;
first, second, third, fourth, fifth and sixth torque-transmitting mechanisms selectively engageable to operatively connect one of said gear elements with said stationary member or with said output shaft;
wherein:
the first and second of said torque-transmitting mechanisms are capable of operatively exchanging power with one another;
operation of said torque-transmitting mechanisms results in an input-split operating mode, a first compound-split operating mode, a second compound-split operating mode and a third compound-split operating mode of the transmission;
the input shaft is operatively connected to the first gear element;
the first torque-transmitting mechanism is mounted to the stationary member and is selectively engageable to operatively connect to the second gear element;
the second torque transmitting mechanism is mounted to the stationary member and is selectively engageable to operatively connect to the third gear element;
the third torque transmitting mechanism is selectively engageable to operatively connect one of said gear elements to the output shaft to form an input-split operating mode, wherein said one of said gear elements is operatively connected to said first or second torque transmitting mechanism,
the fourth torque transmitting mechanism is selectively engageable to operatively connect the fourth gear element to the output shaft to form the first compound-split operating mode;
the fifth torque transmitting mechanism is selectively engageable to operatively connect the fifth gear elements to said output shaft to form the second compound-split operating mode; and
the sixth torque transmitting mechanism is selectively engageable to operatively connect said fourth gear element to the output shaft to form the third compound-split operating mode.

3. The transmission of claim 2, further comprising:
an output member, operatively connected to the output shaft;
wherein:
the third torque transmitting mechanism is selectively engageable to operatively connect said gear element operatively connected to said first or second torque transmitting mechanism to said output member, forming said input-split operating mode,
the fourth torque transmitting mechanism is selectively engageable to operatively connect said fourth gear element to said output member, forming said first compound-split operating mode; and
the fifth torque transmitting mechanism is selectively engageable to operatively connect said fifth gear element directly to said output shaft, forming said second compound-split operating mode; and
the sixth torque transmitting mechanism is selectively engageable to operatively connect said fourth gear element to said output member, forming said third compound-split operating mode.

4. The transmission of claim 3, wherein the output member includes at least one countershaft.

5. The transmission of claim 2, further comprising a seventh torque transmitting mechanism selectively engageable to operatively connect one gear element to another gear element in such a way as to cause all of the gear elements of the gear set to rotate at substantially the same speed.

6. The transmission of claim 5, further comprising an eighth torque transmitting mechanism selectively disengageable to operatively disconnect the input shaft from the first gear element.

7. The transmission of claim 1, wherein the speed ratio between the input shaft and output shaft is selectively variable by selectively engaging the first and second torque transmitting mechanisms to control the rotational speed of the second and third gear elements, respectively.

8. The transmission of claim 5:
wherein a first speed ratio is established between the input shaft and the output shaft, when the third and seventh torque transmitting mechanisms are selectively engaged;
wherein a second speed ratio is established between the input shaft and the output shaft, when third and fourth torque transmitting mechanisms are selectively engaged;
wherein a third speed ratio is established between the input shaft and the output shaft, when the fourth and seventh torque transmitting mechanisms are selectively engaged;
wherein a fourth speed ratio is established between the input shaft and the output shaft, when the fourth and fifth torque transmitting mechanisms are selectively engaged;
wherein a fifth speed ratio is established between the input shaft and the output shaft, when the fifth and seventh torque transmitting mechanisms are selectively engaged;
wherein a sixth speed ratio is established between the input shaft and the output shaft, when the fifth and sixth torque transmitting mechanisms are selectively engaged; and
wherein a seventh speed ratio is established between the input shaft and the output shaft, when the sixth and seventh torque transmitting mechanisms are selectively engaged.

9. The transmission of claim 1, wherein the differential gear set includes a planet carrier, a first sun gear, a second sun gear, a first ring gear and a second ring gear; wherein the planet carrier is equipped with a first set of planet pinion gears which mesh with the first sun gear and first ring gear and a second set of planet pinion gears which mesh with the second sun gear and second ring gear; and wherein the first set of planet pinion gears meshes with the second set of planet pinion gears.

10. The transmission of claim 9, wherein the first gear element is the planet carrier, the second gear element is one of the sun gears, the third gear element is the other of the sun gears, the fourth gear element is one of the ring gears, and the fifth gear element is the other of the ring gears.

11. The transmission of claim 2, wherein the first torque transmitting mechanism and the second torque transmitting mechanism are electric motor- generators.

12. The transmission of claim 1, further comprising an energy storage device for accepting power from, and supplying power to, the first and second torque transmitting mechanisms; and a controller for regulating power flow among the energy storage device and the first and second torque transmitting mechanisms.

13. The transmission of claim 12, wherein the output may be driven by power from the energy storage device alone, without power from the input, through the action of at least one of the first or second torque transmitting mechanisms.

14. A vehicle transmission comprising:

a stationary member;

a differential gear set having a planet carrier, a first sun gear, a second sun gear, a first ring gear and a second ring gear; wherein the planet carrier is equipped with a first set of planet pinion gears which mesh with the first sun gear and first ring gear and a second set of planet pinion gears which mesh with the second sun gear and second ring gear; and wherein the first set of planet pinion gears meshes with the second set of planet pinion gears;

a first electric motor-generator mounted to the stationary member and operatively connected to the first sun gear;

a second electric motor-generator mounted to the stationary member and operatively connected to the second sun gear;

an output shaft;

an output member;

a first clutch selectively engageable to operatively connect the input shaft to the planet carrier;

a second clutch selectively engageable to operatively connect the first ring gear to the second ring gear;

a third clutch selectively engageable to operatively connect the first sun gear to said output member, forming an input-split operating mode;

a fourth clutch selectively engageable to operatively connect the first ring gear to said output member, forming a first compound-split operating mode;

a fifth clutch selectively engageable to operatively connect the second ring gear to said output shaft, forming a second compound-split operating mode; and a sixth clutch selectively engageable to operatively connect the first ring gear to said output member, forming a third compound-split operating mode.

15. The transmission of claim 14, further comprising an energy storage device for accepting power from, and supplying power to, the first and second electric motor-generators; and a controller for regulating power flow among the energy storage device and the first and second motor-generators.

16. The transmission of claim 14, further comprising:

sixth, seventh and eighth gear elements operatively connected to a central shaft for rotation therewith;

a ninth gear element operatively connected to the output shaft for rotation therewith; and tenth, eleventh, twelfth and thirteenth gear elements operatively connected to the output member for rotation therewith.

* * * * *